Patented Apr. 14, 1953

2,635,050

UNITED STATES PATENT OFFICE 2,635,050

METHOD OF PRESERVING FISH OF THE TUNA TYPE

Charles B. Stevenson, Wilmington, and John A. Hodges, Long Beach, Calif., assignors to Harold R. Pauley, Los Angeles, Calif.

No Drawing. Application June 25, 1951, Serial No. 233,492

7 Claims. (Cl. 99—188)

This invention relates to the preparation for canning of fish of the tuna type.

Canned tuna of the type sold for human consumption normally is in the form of small pieces of tuna meat which have been cooked, seasoned and canned. In addition, a quantity of vegetable oil is added during the canning operation to enhance the flavor of the product. In order to prepare the tuna for canning, it has heretofore been the general commercial practice to eviscerate raw fish and without removing either the heads or skin of the fish, cook the whole fish. Because of the large size of the fish and the presence of skin and bones, it is difficult to sufficiently cook all the inner portions of the fish. The result is that a protracted cooking time must be employed, and it is customary to process the fish in cooking chambers for periods ranging from two to eight hours. After this step, the fish meat must be further treated before it can be handled because of its high temperature and also because it is quite friable and flaky due to the long cooking period employed. For this reason, it is customary to place the whole fish in cooling rooms for an extended period of time, for example from eight to twelve hours, or more. During this cooling period, the fish reaches a temperature permitting manual handling. The meat also sets to a degree so that it can be cleaned and cut to convenient sized pieces for canning. The cool fish are then taken from the cooling room and skinned, boned and the meat cleaned and cut to convenient handling size. Next, the meat is then cut into the appropriate sized pieces for canning. These pieces are then packed into cans. Oil, salt and other seasoning ingredients are added, following which the cans are closed and retorted for sterilization.

This process, wherein whole fish are processed in the cooking chambers, possesses very marked disadvantages. Among these are that the protracted processing and cooling periods required are time consuming and greatly add to the expense of the process. Also, the extensive cooking of the fish renders the meat undesirably friable and difficult to handle without breaking the same into small flakes. While this condition is remedied to a degree by the subsequent cooling, it still persists, with the result that considerable waste occurs in the further treatment of the fish. Moreover, the fish necessarily oxidizes to a degree during protracted cooling periods employed, which results in very undesirable discoloration and therefore further waste of the fish. As is well known, the salability of canned tuna depends in large measure upon the whiteness of the color of the meat, and accordingly, any discoloration of the meat is highly undesirable.

A process which eliminates the majority of these problems existing in the above described commercial practice is described in the patent to Borg, No. 2,411,188. In accordance with the Borg process, the raw fish is first cleaned and cut into the proper sized pieces for canning. The raw meat is then placed in the cans, which are then passed through a hot water bath treatment. After a relatively short period of time, the cans are placed in a cold water bath for cooling. Next, the liquids in the meat are mechanically removed. This is accomplished by means of a plunger which squeezes out the liquids, or by rapidly spinning the cans to drive off the liquid by centrifugal action. After removal of such liquids, oil, salt or other seasoning ingredients are added, and the filled cans are sealed and retorted for sterilization in accordance with customary practice. This process represents a substantial improvement over present commercial techniques. For example, the many hours devoted to processing in cooking chambers and cooling the whole fish are eliminated, with the result that substantial savings in the cost of the canning process are realized. In addition, wastage due to the discoloration of the meat during the cooling period and the friable nature of the meat at the time it is cut to proper size for canning, is avoided.

Despite these desirable features, the Borg process has several disadvantages, each of which arises from the fact that the meat is packed in the cans in the raw state. Among these is the difficulty of detecting defective meat. As is well known in the industry, certain tuna is unsuitable for canning due to a defective condition commonly known as "honeycomb." Such condition cannot readily be detected in raw meat. After sufficient processing of the meat in a cooking chamber, however, the meat takes on a characteristic honeycomb appearance which is readily detectable by inspection. Such meat is simply discarded as it is unfit for human consumption. In the Borg process, since the meat is packed in the can raw, the texture of the meat cannot be readily observed thereafter. It is, therefore, exceedingly difficult in such process to detect honeycomb fish which, of course, must be rejected. Another disadvantage of the Borg process is that the raw meat must be thoroughly cleaned prior to packing, since the meat becomes inaccessible thereafter. While this can be accomplished, it has been found that the off-color and blood meat and other substances which are to be removed, can be readily flaked or scraped from meat which has been sufficiently processed in a cooking chamber, but can be separated from raw meat only with difficulty. The result is that the cleaning step of the process is time consuming, and an undesirable amount of waste results. Still a further disadvantage of the Borg process lies in the fact that a whitish gummy substance or curd has been found to separate from the tuna and accumulate in the top and bottom of the can. While the presence of this curd in no way affects the edibility of the product, it does detract from the appearance thereof, and hence is objectionable. The curd is believed to be a protein substance existing between the laminations of the meat. When the raw meat is cut to canning size, as in the Borg process, cuts across the laminations must be made. This releases the curd which coagulates during the hot water bath treatment. One further disadvantage has been found in the Borg process which again results from the packing of raw meat in the cans. This is that a certain amount of shrinkage of the meat necessarily occurs in the hot water bath treatment. Such shrinking will cause the meat to part from the can walls. While again this does not detract from the edibility of the product, it deleteriously affects its appearance.

The present invention is an improvement over the Borg process and substantially eliminates each of the above mentioned disadvantages thereof, at the same time eliminating the time consuming and wasteful nature of the process used in present commercial practice.

Accordingly, it is a principal object of the present invention to provide a rapid method for preparing fish of the tuna type for canning.

It is a further object of the invention to provide such a method wherein a minimum of waste occurs.

It is still another object of the invention to provide such a method wherein an attractive pack results.

It is yet another object of the invention to provide such a method wherein fish unsuitable for canning can be readily detected.

In accordance with the present invention, the raw fish are eviscerated, skinned and boned, and cut into convenient sized loins. While the size of such loins is not critical, it has been found that from two to three pounds is to preferred. The loins are then cleaned. It is a significant advantage of applicant's process, however, that these loins need not be thoroughly cleaned at this stage. As above discussed, thorough cleaning of the raw meat is difficult and wasteful. In accordance with applicant's invention, however, final cleaning occurs at a later stage in the operation, at which time it can be readily accomplished, without waste. Next, the loins are dressed with a one to three per cent brine solution. This can be accomplished either by means of a dip or a spray, and has been found to enhance the color characteristic of the final product. For this reason, the inclusion of this step has been found preferable. It is not, however, absolutely essential, and a satisfactory product will result if it is omitted.

The loins are next cooked, that is, heat processed for a time and at a temperature sufficient to coagulate the proteins throughout the loins. While the time and temperatures necessary to accomplish this result will vary with different sized loins, it has been found that with the size loins above described if steam at a temperature of between 210–212° F. is used, a period of about twenty minutes will be sufficient. As is well known, protein coagulation is evidenced by a change in the color of the meat from a reddish to a whitish hue, and the necessary time and temperature can therefore be readily ascertained by examination of the loins. Further, experience has shown that this condition is realized if a temperature of about 130° F. has been reached in the center of the loin. Heating beyond this point has been found to be unnecessary. While any form of heating medium may be used, live steam is preferred because of its ready availability in conventional canneries. The processing time can, of course, be reduced by using a higher temperature steam. This, however, would require that the processing step be performed under pressure, which would require more complicated and expensive apparatus.

Next, the loins are subjected to a fine water spray immediately after removal from the heating chamber. Ordinary cold tap water may be employed, and a spray slightly heavier than a mist has been found preferable. A number of benefits result from this cold water spray. For example, the spraying of the fish meat with cold water tends to cool the meat so as to permit handling thereof. Also, the wetting of the meat resulting from the spray provides a protective water coating over the meat. In the absence of such a coating, the meat would rapidly oxidize upon leaving the cooking chamber, and in a very short time would discolor. By using a fine spray, such oxidation and consequent discoloration is prevented, and the meat retains its sought after whiteness throughout the remainder of the process. In this regard, if desired, an anti-oxidant such as butylated hydrooxyanisole, propyl gallate or citric acid can be mixed with the spray to further prevent undesired oxidation. Another advantage of the cooling function of the water spray is that the meat, when cooled, will tend to set with the result that the meat will not break up or flake during subsequent handling. While, as above stated, the fine water spray is preferred, these benefits can also be obtained by employing a cold water dip, a solid stream or by refrigeration coupled with an anti-oxidant spray, and it is to be understood that where any reference is made herein to a cold water spray, it is intended that these other expedients be included within the term. The cold water dip, however, has two disadvantages which are that repeated use of the dip would result in contamination thereof, requiring continued replacement of the bath, and undesirable excessive moisture absorption would result. The solid stream is inferior to the cold water spray in that the stream tends to tear up the meat which is in a somewhat friable condition at this stage in the process. In addition, the cold water spray is preferred over refrigeration and anti-oxidant spray because of its convenience and simplicity.

Following the spraying of the loins, they are finally cleaned, and the meat is cut into proper sized pieces and packed into the cans. During this operation, the meat is generally inspected. At this stage in the process, any honeycomb fish can be readily detected and discarded.

After the meat has been packed into the cans, it has been found desirable to reduce the liquid content thereof by means of a plunger or centrifugal spinner in accordance with the Borg process above described. While, as described in the aforesaid Borg patent, certain types of fish contain deleterious materials which must be removed by the liquid extraction method if a satisfactory product is to result, these materials are not present in fish of the tuna type in sufficient quantities to affect the product. Accordingly, it is not essential to the instant process that such liquid extraction step be employed. It has been found, however, that such step provides a convenient and efficient means whereby the moisture content of the final product can be controlled, and accordingly, it is advantageous to incorporate the same in the instant process. It is to be understood, however, that the present invention is not limited to the inclusion of this liquid extraction step, and that the process may be practiced without such step, if desired.

Finally, the cans are hermetically sealed. In addition, in accordance with usual practice, oil such as vegetable oil, salt and other seasoning ingredients may be added prior to the sealing of the cans, and after sealing, the cans retorted.

The above described process possesses a number of very marked advantages over other known processes. As compared to the present commercial practice, it reduces the time of the cooking operation from several hours to a matter of minutes, and it eliminates the time consuming cooling period. In addition, waste due to discoloration occurring during the cooling period is avoided. Moreover, the meat, following the cold water spray, is firm rather than friable, with the result that it may be cut into convenient canning sized pieces without the waste occurring in the present commercial practice.

The process of the present invention possesses marked improvements over that described by Borg in the aforesaid Patent No. 2,411,188. As above described, in the Borg process, raw meat is packed in the cans. It is therefore necessary to fully clean the meat when raw. This is a difficult and somewhat wasteful operation in that the undesirable streaks of off-color meat must be cut away when the meat is in the raw state. This necessarily results in the cutting away of some of the light meat, and hence a certain amount of waste. In accordance with applicant's process wherein the meat is heat processed in convenient sized loins prior to its being cut up and canned, the meat need only be partially cleaned in the raw state. After the heat processing, the off-color meat can be easily scraped or flaked from the loin, a step which can be accomplished rapidly and without waste. Another advantage of the instant process over that of Borg is that a more attractive and hence salable pack results. This is due particularly to two effects. As above described, in order to cut the raw meat to canning size, it is necessary, in the Borg process, to cut across the laminations in the meat. These cuts release a white gummy curd which is formed between such laminations during the heat processing operation. The result is that a substantial amount of such curd exists at the top and bottom of the pack where the Borg process is used. In accordance with applicants' process, however, the raw meat is cut only into relatively large loins, rendering unnecessary the cutting of the raw meat across the laminations thereof. Any curd formed during the heat processing operation therefore remains entrapped between the laminations. It has been found that if the heat processing is conducted to the extent above described, curd will not be released even though cross cuts are later made in the meat. The results is that but negligible quantities of this material appear in the pack prepared in accordance with applicants' invention. On the other hand, if the heat processing is not sufficient to coagulate the proteins in the meat, this desirable result will not be accomplished, and curd will be formed during the subsequent retorting operation, thereby deleteriously affecting the appearance of the pack.

A further reason why a more attractive and hence salable pack results from applicants' process is that shrinkage of meat will occur during the heat processing operation. Hence, if the cans are packed raw as in Borg, the meat will later shrink, with the result that the meat will part from the can walls. This gives an undesirable appearance to the pack. No such parting occurs in applicants' process wherein the meat is sufficiently heat processed prior to packing.

Another very significant improvement over the Borg process is that defective or "honeycomb" fish are readily detectable. As above described, honeycomb fish, which are considered inedible, are exceedingly difficult to detect when the meat is in the raw state. This characteristic, however, becomes strikingly apparent upon cutting crosswise or across the laminations of the meat after the same has been heat processed to the extent herein described. Accordingly, since Borg packs the meat in the raw state, the processed meat is not accessible for thorough inspection. This difficulty is enhanced by the aforesaid white curd which appears at the top of the pack. On the other hand, where applicants' process is employed, the processed meat can be readily examined and honeycomb meat discarded.

Thus, applicants have provided a method for processing tuna or the like which very greatly reduces the time required and waste existing in present commercial practice. While the Borg process in general accomplishes these desired results, it possesses certain disadvantages, particularly the appearance of the pack and the difficulty of detecting unsuitable meat. Applicants' method retains the advantages of the Borg process, and at the same time eliminates these disadvantages.

While there has been described what is at present considered the preferred embodiment of the present invention, it will be appreciated by those skilled in the art that various changes and modifications can be made therein without departing from the essence of the invention, and it is intended to cover all such changes and modifications as come within the true spirit and scope of the appended claims.

We claim:

1. The method of preserving fish of the tuna type comprising the steps of eviscerating, boning, skinning and cutting the whole fish into loins, dressing the loins with a brine solution, thereafter and prior to canning cooking the loins to coagulate the proteins therein, subjecting the loins to a cold water spray and subsequently cutting the loins into packing size pieces, packing such pieces into cans and finally hermetically sealing the cans.

2. The method of preserving fish of the tuna type comprising the steps of eviscerating, boning, skinning and cutting the whole fish into loins, thereafter and prior to canning cooking the loins to coagulate the proteins therein, subjecting the loins to a cold water spray, finally cleaning the loins and subsequently cutting the loins into packing size pieces, packing such pieces into cans and finally hermetically sealing the cans.

3. The method of preserving fish of the tuna type comprising the steps of eviscerating, boning, skinning and cutting the whole fish into loins, dressing the loins with a brine solution, thereafter and prior to canning cooking the loins to coagulate the proteins therein, finally cleaning the loins, and subsequently cutting the loins into packing size pieces, packing such pieces into cans and finally hermetically sealing the cans.

4. The method of preserving skinned loins of eviscerated and boned fish of the tuna type comprising the steps of cooking the loins to coagulate the proteins therein, subsequently cutting the loins into packing size pieces, and thereafter packing such pieces into cans and hermetically sealing the cans.

5. The method of preserving skinned loins of eviscerated and boned fish of the tuna type comprising the steps of cooking the loins to coagulate the proteins therein, subjecting the loins to a cold water spray, subsequently cutting the loins into packing size pieces, and thereafter packing such pieces into cans and hermetically sealing the same.

6. The method of preserving skinned loins of eviscerated and boned fish of the tuna type comprising the steps of dressing the loins with a brine solution, thereafter and prior to canning cooking the loins to coagulate the proteins therein, and subsequently cutting the loins into packing size pieces, packing such pieces into cans and finally hermetically sealing the cans.

7. The method of preserving skinned loins of eviscerated and boned fish of the tuna type comprising the steps of dressing the loins with a brine solution, thereafter and prior to canning cooking the loins to coagulate the proteins therein, subjecting the loins to a cold water spray, finally cleaning the loins, and subsequently cutting the loins into packing size pieces, packing such pieces into cans and finally hermetically sealing the cans.

CHARLES B. STEVENSON.
JOHN A. HODGES.

References Cited in the file of this patent
UNITED STATES PATENTS

| Number | Name | Date |
|---|---|---|
| 2,411,188 | Borg | Nov. 19, 1946 |
| 2,446,889 | Sjostrom | Aug. 10, 1948 |
| 2,493,586 | Lang | Jan. 3, 1950 |